April 23, 1929.  H. C. SMITH  1,710,119
VISIBLE MEASURE
Filed Feb. 3, 1928   3 Sheets-Sheet 1

Herbert C. Smith,
Inventor
Delos G. Haynes,
Attorney

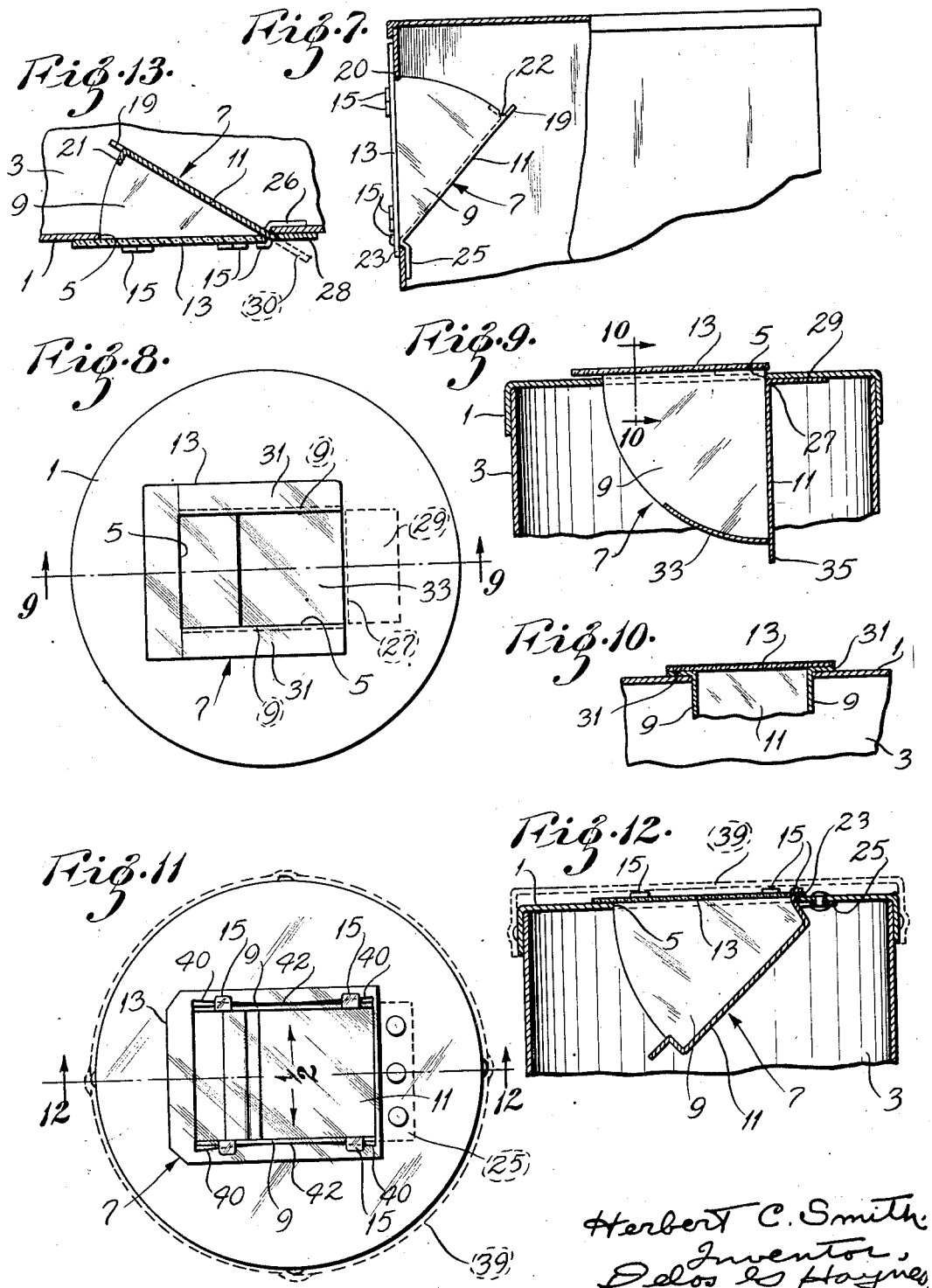

April 23, 1929.  H. C. SMITH  1,710,119
VISIBLE MEASURE
Filed Feb. 3, 1928  3 Sheets-Sheet 3
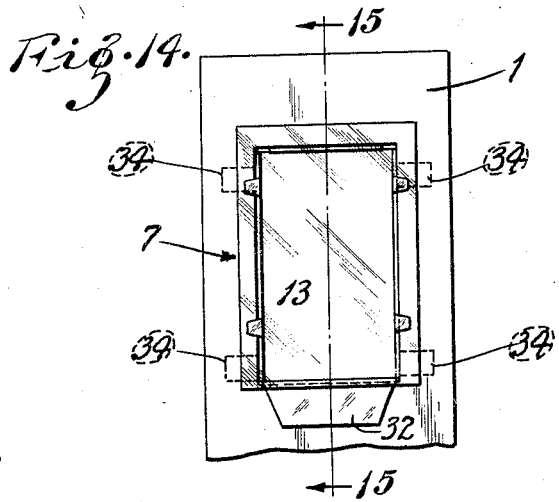
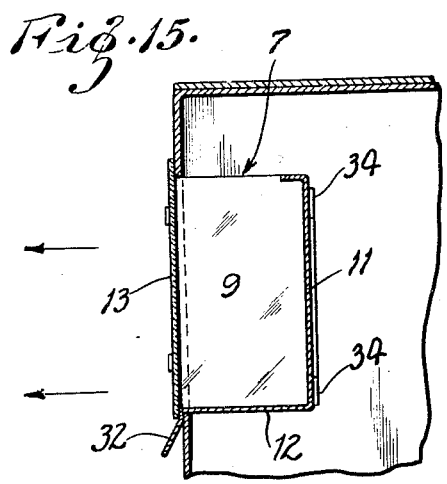
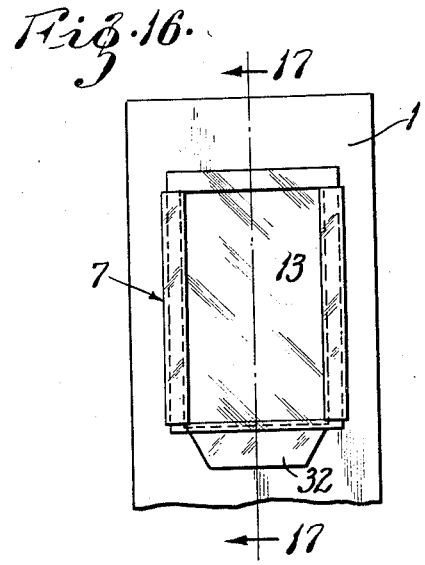
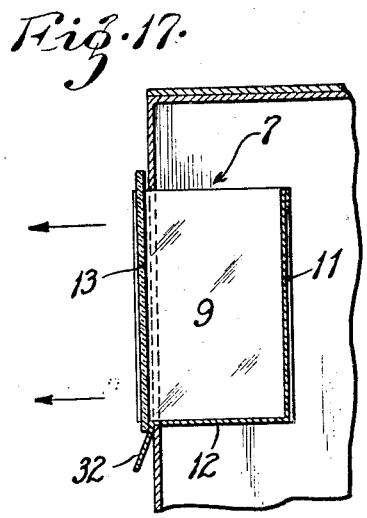

Patented Apr. 23, 1929.

1,710,119

UNITED STATES PATENT OFFICE.

HERBERT C. SMITH, OF UNIVERSITY CITY, MISSOURI, ASSIGNOR TO DILLON T. STEVENS, OF UNIVERSITY CITY, MISSOURI.

VISIBLE MEASURE.

Application filed February 3, 1928. Serial No. 251,594.

This invention relates to measuring devices, and with regard to certain more specific features to a visible measure, forming part of a container, the latter being preferably for dry granular materials, objects or articles.

Among the several objects of the invention may be noted the provision of a visible measuring device held to a portion of a container, which device also functions as a display for goods carried within said container; and the provision of a device of the class described which may be economically manufactured, readily applied to packages and which is simple but effective in its operation. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which are illustrated several of various possible embodiments of the invention, Fig. 1 is a plan view showing a preferred form of the invention;

Fig. 7 is a side elevation, parts being shown in section, illustrating the application of the device to the side of a container;

Fig. 8 is a plan view showing another form of the invention;

Fig. 9 is a cross section taken on line 9—9 of Fig. 8;

Fig. 10 is a cross section taken on line 10—10 of Fig. 9;

Fig. 11 is a plan view of another modified form of the invention;

Fig. 12 is a cross section taken on line 12—12 of Fig. 11;

Fig. 13 is a cross section showing a modification;

Fig. 14 is a front elevation showing a modified non-hinged form;

Fig. 15 is a vertical section taken on line 15—15 of Fig. 14;

Fig. 16 is a front elevation of another non-hinged modification; and,

Fig. 17 is a vertical section taken on line 17—17 of Fig. 16.

Similar reference characters indicate corresponding parts throughout the several views of the drawings.

Figure 2:
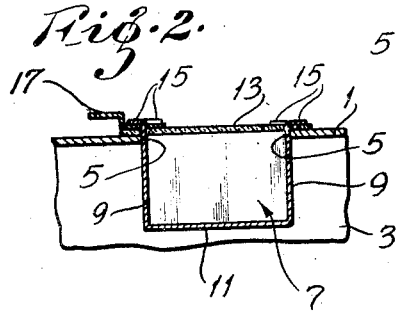
Fig. 2 is a cross section taken on line 2—2 of Fig. 1.
Figure 1:
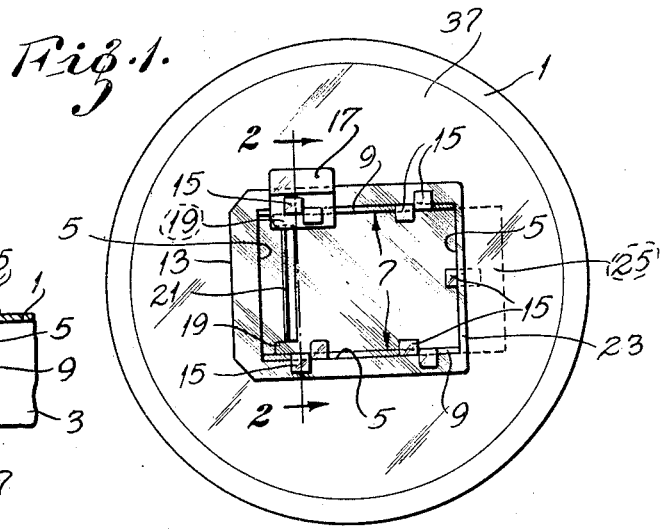

Referring now more particularly to Fig. 1, there is illustrated at numeral 1 the top of a container of the type used in retailing coffee or other products and similar dry substances of granular form. In the present invention the top 1 is fastened to the body 3 of the package after the package has been filled.

A rectangular opening 5 is cut into the top or cover 1, which opening is adapted to snugly accommodate the body portion of a measuring hopper or chute 7. The chute 7 comprises side walls 9, a sloping back 11 and a forwardly located transparent wall or window 13, the latter being held to the remainder of the chute by bent-over ears 15, one group of which ears also serve to fasten on a finger piece 17. The window 13 may be composed of celluloid, isinglass or the like. The lower end of the chute is hinged at one edge of the opening 5, while the upper edges of the side walls 9 are arcuately formed with the hinge line as center. The arcuate edges snugly engage the opposite end of said opening 5.

Examination of Figs. 1 to 4 indicates that the window 13 is larger than the opening 5. By this means it is made to function as a stop to prevent the chute from dropping rearwardly into the container. Also, the window lies practically flush with the outer surface of the container when the chute is in retracted position, thereby forming means for attractively displaying goods under conditions to be described.

The chute is limited in its forward movement by the action of two ears 19 formed with the back 11 and engaging the wall of the container when the chute is in outward or delivery position. A lip 21 is provided for positively cutting off flow of material out into the chute when the chute is in its delivery position.

Hinging of the chute is accomplished by the lower extension 23 of the window 13 and a rearwardly formed tongue 25, the latter being an extension of the back 11. In order to apply the chute to the cover 1, the lip 25 is bent up as illustrated in Fig. 6. This permits application of the chute to the opening 5, after which the tongue may be bent down into the position shown in Figs. 1 and 3 to 5. It is to be understood that this bending operation is accomplished before the cover 1 is applied to the container or, if the chute is applied to the side of the container, the bending is accomplished inside before the container is closed.

The operation is simple and effective. Assuming the container to be filled with granular material, such as coffee or rice or small candy, it is tilted to the Fig. 3 position, the chute 7 being held in said Fig. 3 position by the fingers, or friction may be great enough to hold it in said position.

Figure 4:
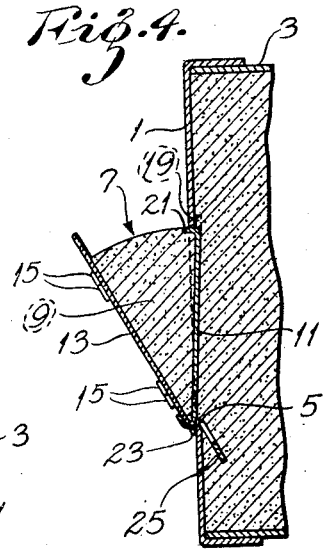
Fig. 4 is a view similar to Fig. 3, but shows the container positioned horizontally and the measure in an alternate position.

Then by positioning the container substantially as shown in Fig. 4 and hinging the chute 7, a measurement is made.

Figure 5:
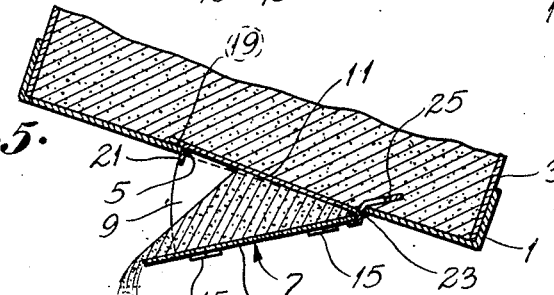
Fig. 5 is a view similar to Fig. 4, showing the container and measure tilted for delivering a charge.
Figure 6:
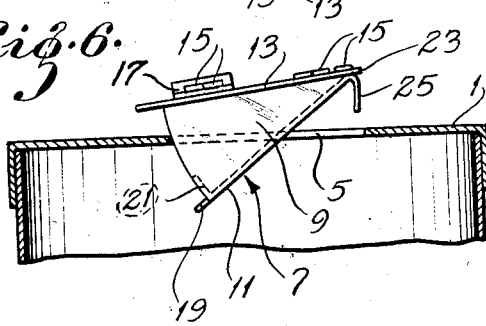
Fig. 6 is a longitudinal section showing one method of applying the measure.

Thereafter the container may be tilted as shown in Fig. 5, thereby discharging the measured contents of the chute. The rear wall 11 prevents any further discharge from the container.

The advantages of the construction are that means are always handy on each package for obtaining a predetermined measure of material. This is of importance for obtaining uniform results in using the materials, such as for instance coffee. (Coffee merchants have found that the primary cause of lack of consistent results in brewing coffee from a given brand is the variation in measuring effected by old methods.) After a measurement has been made, the container is again put into upright position and the chute returned to its Figs. 1 and 2 position for another charge.

The window 13 permits the operator to easily see whether or not he has filled the measure, and whether the goods are what he wants to dispense, before he needs to open the measure. It also permits the operator to readily ascertain how full the measure is and what the character is of the material in the measure. In some cases it is desirable to use indicia on the window for fractional measurements, such as indicated at the numeral "½" in Fig. 11.

The device can be operated with one hand, by the operator holding the hopper or chute or scoop 7 closed and inverting the package and then righting the package again; or it can be operated with two hands. The tight fit between the walls and the opening prevents the chute from falling open inadvertently.

After an operator has filled a measure he can easily empty it by setting the box up again, if he decides that he does not want to dispense any of the goods; or he can dispense part of the goods and then close the chute, invert the box and thereby return the rest of the goods to the container.

It is to be understood that a full-stroke device, such as a detent 20 and notch 22 are sometimes used to hold the chute tightly closed and/or fully open (see Fig. 7). This may or may not be in addition to the holding power afforded by the friction engagement between the opening and the chute.

The invention is advantageous and useful in stores for dispensing predetermined volumes of candy and the like, and is also advantageous in the kitchen and in various other ways.

In Fig. 7 is shown a modified form of the invention in which the measure is applied to the side wall of a container. In this case the measure may be filled and permitted to remain in its retracted position while the container stands up. Hence the window 13 serves as means for permitting examination of the contents of the container by a prospective purchaser.

In Figs. 8 to 10 are shown a modified form of chute or hopper in which the body 7 is composed of cardboard, fiber or the like, which may be readily bent and folded to shape. In this case a hinge is readily formed by providing a score line 27 and a tab 29. The tab may be glued or otherwise fastened to the interior of the container, adjacent the opening. Laterally bent tabs 31 are used for gluing on the window 13. In this modification the cutting off portion 33 reaches for some distance and prevents granules from being interposed between the stop 35 and the top 1, because said granules usually roll off of the surface of the portion 33, before the stop 35 reaches the top 1. In this case the stop may be formed across the entire width of the chute, instead of merely as the ears 19 of the preferred form.

Figs. 11 and 12 show another modification in which the metallic tongue 25 is riveted directly to the cover. Hinging is accomplished by bending the chute on said tongue and a stiffer action is thus attained without depending entirely upon friction. The ordinary commercial package is not used long enough to permit the continued bending action to reach the breaking stage. Some of the hinging action is also assumed by the material composing the package.

It is to be understood that the dispensing portion of the hopper may be as wide or as narrow as desired and may converge to a funnel shape for reducing the outlet area to facilitate dispensing to small orifices. The construction shown in Figs. 8 to 10 has this effect, because of the constricting portion 33.

Various means may be employed for positively holding the chute in retracted position during transit, such as for instance by wrapping the package, pasting tissue over the cap 1, or having a second locking cap over the cap, as shown in the drawing.

The manner in which the tissue may be applied is illustrated at numeral 37 in Fig. 1. The tissue may be cut around the window 13 when the package is put into use.

The application of the second locking cap is shown by dotted lines and numeral 39 in Figs. 11 and 12.

In Fig. 11, at numerals 40 is shown in solid lines how the opening in the box is sometimes caused to be slightly deviated from a right angular figure, that is, from the shape of the chute. The purpose of this is that the bulges 42 (which tend to press on the side of the chute) provide increased friction to hold the chute in a predetermined position.

Figure 3:
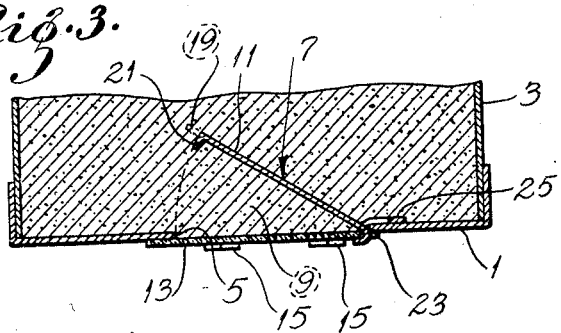
Fig. 3 is a vertical section of the device shown in Figs. 1 and 2, but showing an inverted container.

In Fig. 13 is illustrated a modified form, similar to the Fig. 3 form, but in which the rearward tongue 25 has been changed to comprise a plurality of rearward separated tongues 26. The remainder of the space across the chute comprises a forwardly located tongue 28 which is (as delivered to the customer) in the full line position. The customer upon receiving the package bends the tongue out to the dotted line position 30 and thereafter uses the tongue as a pressure piece which when pressed causes the chute to spring out into discharge position.

In Figs. 14 to 17 are shown modified forms of the invention. These figures are set out by way of illustrating that the chute need not necessarily be hinged to the container but may be made slidable, not unlike a drawer.

Referring to Figs. 14 and 15 there is shown a portion of the container 1 with the hopper or chute 7 in closed position. The chute 7 again comprises side walls 9, a back 11, a bottom 12 and a transparent window 13. The distinction over the previous form is that the device is made rectangularly instead of triangularly. A forwardly located lip or tongue 32 is used for control purposes. Frictional engagement steadies the operation.

As in the previous form, the chute is loaded by positioning it within the container, as illustrated in Fig. 15. When it is desired to discharge, the chute is pulled forward in a translatory manner instead of a rotative manner as in the other forms. In other words it slides out until stops 34 on the rear wall 11 engage the side of the container to prevent complete removal of the shoe as a whole.

In Figs. 16 and 17 is shown another modification, similar to the Figs. 14 and 15 formed, in which the stops 34 are eliminated, thereby providing means whereby the chute may be entirely removed from the package for measuring purposes. When this latter form is used it is preferable that the package be not completely filled, because otherwise the contents would spill when the chute became removed.

It is to be understood that the openings used in the package need not be rectangular but may have other shapes.

In view of the above, it will be seen that the several objects of the inventions are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A container having an opening, and a visible measure therein comprising, a chute pivoted to one edge of said opening and adapted to move into and out of the container, said chute having a transparent front wall adapted to display goods in the container.

2. A visible measure, forming part of a container having an opening and a measuring chute hinged at one edge of said opening and adapted to swing into and out of the container through said opening, said chute having a transparent front wall adapted to display goods in the chute, said chute also having a rear wall adapted to prevent discharge of goods from the container when the chute is in its outer position.

3. A container having a visible measure comprising an opening in said container, a chute positioned in said opening and movably mounted on said container for movement into and out of the container and stops limiting said movements, said chute having a transparent front wall adapted to display goods in the chute.

In testimony whereof, I have signed my name to this specification this 1st day of February, 1928.

HERBERT C. SMITH.